3,074,911
POLYURETHANE RESIN COATING COMPOSITION CONTAINING CARBAMYL CHLORIDE STABILIZER
Lee Richard Harper, Media, Pa., assignor to E. I. du Pont de Nemours and Company, Wilmington, Del., a corporation of Delaware
No Drawing. Filed Dec. 5, 1957, Ser. No. 700,749
2 Claims. (Cl. 260—45.85)

This invention relates to liquid coating compositions of the paint, enamel and varnish type, and more particularly to such compositions containing a particular class of polyurethane reaction product as the essential organic film-forming constituent.

Polyurethane polymers which are reaction products of polymers and organic diisocyanates are known, as are liquid coating compositions containing such polymers in solution in a volatile organic solvent. Practically useful coating compositions of this type are commonly made by mixing solutions of two separately prepared and mutually reactive polymers immediately before the ultimate coating composition is to be used because the ultimate composition is unstable on storage due to the tendency to increase objectionably in viscosity and/or to gel in the container. Storage-stable single-package liquid coating compositions based on polymer-diisocyanate reaction products are needed for the convenience and economy they offer to both the manufacturer and the consumer mainly by means of having the one final composition made by the manufacturer in a directly useful form and having this form free of objectionable viscosity increase during storage.

The primary objective of this invention is to provide such storage-stable single-package liquid coating compositions which have the desirable property of air-drying rapidly by solvent evaporation and by chemical reaction with water in the atmosphere when coatings thereof are brushed, sprayed or otherwise applied to suitable substrates such as wood, metal, plaster, concrete, linoleum and the like. A further objective is to provide such compositions which also yield coatings having a desirable balance of properties including adhesion, hardness, toughness, flexibility, durability, wearability, and resistance to damage from water, oil, soap, and solvents like nail polish remover or clothing spot remover.

These objectives are accomplished by providing a stable, air-drying liquid organic coating composition consisting essentially of a solution in volatile organic solvent of a polyurethane reaction product of (a) 1 mol of polypropylene glycol having a molecular weight of about 500–3000, or a mixture of at least 85 mol percent thereof with polyethylene glycol and/or polybutylene glycol of the same molecular weight range, (b) 0–1 mol of saturated aliphatic diol containing 2–6 carbon atoms per molecule, (c) 0.5–4.0 mols of saturated aliphatic triol containing 3–6 carbon atoms per molecule, and (d) organic diisocyanate in an amount sufficient to provide 1.5–2.4 isocyanate groups for each hydroxyl group provided by components (a), (b), and (c), which reaction product is prepared in the presence of at least 0.003% by weight based on said diisocyanate of chlorine in the form of a compound which produces chloride ions and is acidic in water.

The polyurethane reaction products specified above are prepared by reacting the components at any convenient temperature, preferably somewhat above room temperature (20°–25° C.) to hasten the reaction but not above about 150° C. where undesirable reactions occur, in a dry (substantially water-free) environment for the length of time required to react substantially all of the available hydroxyl groups with isocyanate groups. The end-point can be estimated by calculating the amount of free isocyanate that should be present after all of the hydroxyl groups are consumed. As the reaction progresses, samples can be titrated with n-butyl amine to determine the actual isocyanate content, and the reaction can be considered complete when this approaches the estimated value. At the especially convenient temperature of 70°–120° C. this usually requires 1–6 hours. The reaction can be carried out in the absence or presence of solvent. The presence of solvent is preferred because it provides a convenient means of drying the charge and the apparatus by azeotropic distillation before the diisocyanate is introduced. Suitable solvents are, for example, aromatic hydrocarbons such as toluene and xylene, aliphatic hydrocarbons such as hexane and mineral spirits, lower ketones such as methyl isobutyl ketone, lower alkyl esters such as ethyl acetate, other polar solvents, and mixtures of such materials. The aromatic hydrocarbons, or mixtures high in aromatic hydrocarbon content, are preferred.

Solvents which are added to the liquid coating compositions of this invention after the compositions have been made, for such purposes as thinning to spray viscosity, should be substantially water-free to prevent premature reaction of isocyanate with water in case the thinned material is permitted to stand very long before being used.

The required polypropylene glycol is a polymer of 1,2-propylene oxide or 1,2-propanediol having a molecular weight of about 500–3000, which can be determined by the well known method involving boiling point elevation. The range of 500–3000 is critical to the extent that substantially higher or lower molecular weights produce undesirable products. A molecular weight substantially less than 500, for example 200, yields relatively expensive coatings lacking in toughness, durability and flexibility. A molecular weight substantially higher than 3000, for example 5000 or 10,000, is too high because the subsequent reaction with diisocyanate is likely to produce highly viscous, insoluble or gelled polymers which are not practically usable in high solids content, readily flowable vehicles for paints, enamels or varnishes. Even the practically usable products from such higher molecular weight polymers are not entirely satisfactory because of relatively poor abrasion resistance and chemical resistance. The preferred molecular weight is 800–1500. A small proportion of the polypropylene glycol, not more than 15 mol percent, can be replaced by an equal molar proportion of polyethylene glycol and/or polybutylene glycol having a molecular weight of 500–3000 without sacrificing essential properties.

The saturated aliphatic diols useful in this invention are ethylene glycol, diethylene glycol, propylene glycol, trimethylene glycol, butylene glycol, tetramethylene glycol, pentamethylene glycol and hexamethylene glycol. Their presence tends to impart toughness to the ultimate coatings, but not more than one mol of such diol is needed for each mol of polypropylene glycol. Tetra- and pentamethylene glycols are preferred.

Examples of the saturated aliphatic triols required in this invention are glycerine, trimethylol ethane, trimethylol propane and hexanetriol. At least 0.5 mol of such triol per mol of polypropylene glycol is required to obtain crosslinking of the components during drying or curing of the coating which provides hardness and toughness; but more than 4 mols of triol for each mol of polypropylene glycol tend to yield unacceptable brittleness in the ultimate coating. The preferred amount of triol is 1–2.5 mols for each mol of polypropylene glycol. The preferred triols contain 5–6 carbon atoms, e.g. trimethylol ethane and trimethylol propane.

Examples of the organic diisocyanates useful in this invention are 2,4-tolylene diisocyanate, 2,6-tolylene diisocyanate, 1,3-phenylene diisocyanate, methylene bis (4-phenyl isocyanate), 4-chloro-1,3-phenylene diisocyanate, 1,5-naphthalene diisocyanate, 4,4'-biphenylene diisocyanate, 1,4-tetramethylene diisocyanate, 1,6-hexamethylene diisocyanate, 1,10-decamethylene diisocyanate, 1,4-cyclohexylene diisocyanate, methylene bis (4-cyclohexyl isocyanate) and 1,5- tetrahydronaphthalene diisocyanate. The arylene diisosyanates, i.e. those in which the isocyanate groups are attached to an aromatic ring, are preferred. A particularly preferred species is 2,4-tolylene diisocyanate.

The diisocyanates are used in such proportions that they provide at least 1.5 isocyanate groups for each hydroxyl group provided by the hydroxyl-containing components previously described. Substantially less than this amount leads to gellation during preparation of the coating composition or lack of the required storage stability. Using more than 2.4 isocyanate groups for each hydroxyl group provided by the hydroxyl-containing components leads to high cost (without compensatory improvements), poor resistance to yellowing of the coatings during service, and a toxicity problem due to the presence of free diisocyanate. The preferred number of isocyanate groups for each hydroxyl group is 1.6–2.

The presence of at least 0.003% by weight of chlorine, based on the weight of the organic diisocyanate, in the form of a compound which produces chloride ions in water and is acidic in water is critical to the extent that the absence of chlorine or the presence of substantially less than 0.003% yields insoluble or gelled polymers or coating compositions which are not storage-stable. This is particularly the case when ordinary commercial grades of the various polyhydroxy components previously described are used. In general, the more nearly chemically pure the polyhydroxy components are, the less chlorine is needed; but it has been found that the 0.003% mentioned above is a minimum for practical and economical commercial operations. A practical maximum chlorine content is 0.06% by weight based on the weight of the organic diisocyanate. A preferred range is 0.01%–0.02%.

Examples of suitable chlorine compounds are carbamyl chlorides, acyl chlorides, hydrogen chloride, phosgene, benzoyl chloride and o-chlorobenzoyl chloride. A preferred method of adding the chlorine compound is in admixture with the organic diisocyanate. Chlorine sometimes occurs as an impurity in certain commercial grades of organic diisocyanates. It is believed to exist therein as a carbamyl chloride. The chlorine content of a commercial diisocyanate can be increased, for example, by adding thereto dry hydrogen chloride or another compound mentioned above and can be decreased, for example, by distillation or by blending with a diisocyanate containing less or no chlorine. The chlorine content of a diisocyanate can be determined by reacting the diisocyanate with a large excess of an alcohol, e.g. analytical grade isopropanol, acidifying with dilute nitric acid and titrating ionic chlorine (chloride) potentiometrically with silver nitrate solution.

The coating compositions of this invention can be pigmented for reinforcing, coloring or hiding purposes. They can also be prepared as clear coating compositions without pigment. Suitable pigments include metal oxides, sulfides, sulfates, silicates and chromates, metal powder or flake, carbon black, iron blues, and organic dyestuffs and lakes thereof. Other common additives for liquid organic coating compositions can also be used, such as hardeners, softeners, catalysts and surface active agents.

A particularly useful additive is a trialkyl amine, which quite unexpectedly shortens the drying time of coatings of this invention under low-humidity conditions, i.e. in air having a relative humidity less than about 40%. Examples of suitable amines are triethyl amine, diethyl cyclohexyl amine, dimethyl dodecyl amine, dimethyl octadecyl amine, dimethyl stearyl amine and dimethyl coco amine in which the coco stands for the mixture of alkyl radicals of the predominantly $C_{12}$–$C_{18}$ fats in coconut oil. The preferred trialkyl amines contain at least 6 carbon atoms and have a boiling point of at least about 90° C. so they do not evaporate from the wet coating, and thus become ineffective, while the coating is drying in air at normal atmospheric temperatures. Still further preferred trialkyl amines are the dimethyl higher alkyl amines in which the higher alkyl group contains about 8–18 carbon atoms.

When used, only a small amount of such an amine is required, i.e. 0.05–2.0% by weight of the total polyurethane reaction product in the coating composition, preferably only 0.1–0.5%.

Since the curing or insolubilization of the polyurethane polymers described herein is effected by reaction with water and this reaction is to be avoided until the coating compositions are applied to the desired substrate, water should be excluded or limited to an innocuous amount during the preparation and storage of the products of this invention.

It is to be understood that the air-drying of the products of this invention is not limited to normal atmospheric temperatures. Drying can be hastened by force-drying or baking at elevated temperatures, which are preferably between 100° and 200° F. When the water content of the atmosphere is low, drying can be hastened not only by adding a trialkyl amine as mentioned above but also by increasing the humidity, such as by introducing steam.

The following examples illustrate the principles and practice of this invention, but the scope of the invention is not limited by these specific examples. Unless otherwise indicated the parts and percentages are given by weight. In all instances, the chlorine content given is that amount determined by the previously described analytical procedure. The percentage is based on the weight of the diisocyanate.

*Example 1*

| | Parts by weight |
|---|---|
| Polypropylene glycol (molecular wt. 1014) | 8,000 |
| Trimethylol propane | 1,072 |
| Xylene and mixed aromatic hydrocarbon solvents (boiling range 130°–195° C.) | 13,652 |
| Toluene solvent | 4,428 |
| Tolylene diisocyanate (80% 2,4-; 20% 2,6-), chlorine 0.017% | 6,960 |
| | 34,112 |
| Less solvent distilled | 4,428 |
| Yield | 29,684 |

The reactants in this charge are present in amounts providing approximately the following relative proportions: 1 mol of polypropylene glycol, 1 mol of triol (trimethylol propane) and 2 isocyanate groups for each hydroxyl group.

The polyurethane reaction product is obtained by charging the first four ingredients into a closed vessel equipped with a thermometer, an agitator, a reflux condenser with take-off head and water trap, and a "Drierite" desiccant-filled vent to the atmosphere.

Since the solvents are known to contain a small amount of water, the first four ingredients of the charge are heated to about 142° C., and 4428 parts by weight of solvent are distilled off to remove substantially all of the water.

The dried intermediate is cooled to room temperature, and the tolylene diisocyanate is then added. The resulting charge is heated to about 120° C. for about 3 hours. The resulting polyurethane solution has a viscosity of about B (Gardner-Holdt) at a solids content of about 55%.

The product is stable and does not change materially in viscosity during storage in a closed full can.

The product is applied to a wood floor by brushing a thin coating thereon. The coating is dry and hard after drying overnight in air at normal room temperature, relative humidity 50%.

*Example 2*

| | Parts by weight |
|---|---|
| Polypropylene glycol (molecular wt. 1014) | 8,000 |
| Trimethylol ethane | 978 |
| Xylene and mixed aromatic hydrocarbon solvents (boiling range 130°–195° C.) | 13,652 |
| Toluene solvent | 4,428 |
| 2,4-tolylene diisocyanate with dry HCl added to chlorine content of 0.02% | 8,352 |
| | 35,410 |
| Less solvent distilled | 4,428 |
| Yield | 30,982 |

The reactants in this charge are present in amounts providing approximately the following relative proportions: 1 mol of polypropylene glycol, 1 mol of triol (trimethylol ethane) and 2.4 isocyanate groups for each hydroxyl group.

A coating composition of this invention having a viscosity of about A (Gardner-Holdt) and having properties substantially the same as the product of Example 1 is prepared by the process of that example.

*Example 3*

24 parts by weight of N,N-dimethyl dodecyl amine are added to half of the product of Example 2 (15,491 parts of solution containing about 8,665 parts of polyurethane polymer solids). This is in the proportion of 0.28% of the weight of the polymer solids.

During several days' storage in a closed container, this product increases slightly in viscosity to D–E (Gardner-Holdt) and then remains substantially constant.

The product dries more quickly and completely in air at about 25% relative humidity than the analogous product of Example 2.

Substantially equal weights of other trialkyl amines, e.g. triethyl amine or dimethyl coco amine, can be substituted for the dimethyl dodecyl amine in this composition.

*Example 4*

| | Parts by weight |
|---|---|
| Polypropylene glycol (molecular wt. 1025) | 1025 |
| Trimethylol propane | 134 |
| Tolylene diisocyanate (80% 2.4-; 20% 2,6-), chlorine 0.017% | 870 |

The reactants are present in amounts providing approximately the following relative proportions: 1 mol of polypropylene glycol, 1 mol of triol and 2 isocyanate groups for each hydroxyl group.

The polyurethane reaction product is obtained by heating the charge at about 80° C. for two hours after the initial temperature rise to about 110° C. has subsided. The reaction is carried out in a closed vessel containing an atmosphere of dry nitrogen and having a thermometer, an agitator and a desiccant-filled vent to the atmosphere.

A pigmented coating composition of this invention is made by grinding the following components together in conventional paint grinding apparatus until a smooth dispersion is produced.

| | Parts by weight |
|---|---|
| Polyurethane product prepared immediately above (no solvent) | 70 |
| Pigment slurry | 96 |

The pigment slurry is prepared as a means of dehydrating both pigment and solvent by distillation. 500 parts by weight of titanium dioxide is slurried with 200 parts of methyl isobutyl ketone and 200 parts of toluene. The mixture is heated to 115°–120° C. in a reaction vessel equipped with a reflux condenser having a water trap. About 40 parts of distillate containing substantially all of the water in the slurry is removed and discarded.

The resulting pigmented product is thinned to spraying viscosity with xylene and is sprayed on a metal article to provide a coating about 2 mils thick when dry. The wet coating dries hard by solvent evaporation and reaction of the polyurethane polymer with atmospheric moisture. The product is stable during prolonged storage in a closed full can.

Other conventional paint pigments can be substituted for all or part of the titanium dioxide used in this example. The other coating compositions of this invention can be pigmented likewise.

The remaining examples provide additional polyurethane reaction products, all of which are useful as film-forming components in clear or pigmented coating compositions of this invention. All are stable during prolonged storage. All dry to hard tough coatings when thin liquid coatings thereof on substrates of the general character previously described are exposed to air under normal atmospheric conditions.

*Example 5*

| Charge: | Parts by weight |
|---|---|
| Polypropylene glycol (molecular wt. 1025) | 1025 |
| Trimethylol propane | 134 |
| N,N-dimethyldodecyl amine | 40 |
| Hexamethylene diisocyanate, chlorine 0.005% | 840 |
| Mixed aromatic hydrocarbon solvents (boiling range 150°–190° C.), dried | 2010 |

Proportions:
- Polypropylene glycol __ 1 mol.
- Triol _____ 1 mol.
- Diisocyanate _____ 2 isocyanate groups per hydroxyl group.
- Amine _____ 2% on polymer solids.

The polyurethane reaction product is prepared by the procedure of Example 1 without the water-removal step and with the reaction period reduced to 90 minutes. Amine cooked with the charge, as in this example, has substantially the same effect as subsequently added amine in improving the air drying speed under low humidity conditions. However, the presence of amine during the reaction usually hastens the reaction.

*Example 6*

| Charge: | Parts by weight |
|---|---|
| Polypropylene glycol (molecular wt. 1025) | 1025.0 |
| Trimethylol propane | 268.0 |
| N,N-diethylcyclohexyl amine | 2.6 |
| Tolylene diisocyanate (80% 2,4-; 20% 2,6-), chlorine 0.017% | 1392.0 |
| Mixed aromatic hydrocarbon solvents (boiling range 150°–190° C.), dried | 2685.0 |

Proportions:
- Polypropylene glycol __ 1 mol.
- Triol _____ 2 mols.
- Diisocyanate _____ 1.6 isocyanate groups per hydroxyl group.
- Amine _____ 0.1% on polymer solids.

The polyurethane reaction product is prepared by the procedure of Example 4, i.e. in the absence of the solvent which is added at the end of the reaction.

*Example 7*

| Charge: | Parts by weight |
|---|---|
| Polypropylene glycol (molecular wt. 1014) | 3,600 |
| Polyethylene glycol (molecular wt. 600) | 240 |
| Trimethylol propane | 536 |
| Xylene and mixed aromatic hydrocarbon solvents (boiling range 130°–195° C.) | 6,831 |
| Toluene solvent | 2,214 |

| | Parts by weight |
|---|---|
| Tolylene diisocyanate (80% 2,4-; 20% 2,6-), chlorine 0.017% | 3,480 |
| | 16,901 |
| Less solvent distilled | 2,214 |
| Yield | 14,687 |
| Dimethyl dodecyl amine added | 8 |

Proportions:
- Polypropylene glycol _____ 0.9 mol.
- Polyethylene glycol _____ 0.1 mol.
- Triol _____ 1 mol.
- Diisocyanate _____ 2 isocyanate groups per hydroxyl group.
- Amine _____ 0.1%.

The polyurethane reaction product is prepared by the procedure of Example 1 except that heating after addition of the diisocyanate is continued for only 1 hour and 10 minutes.

Example 8

| Charge: | Parts by weight |
|---|---|
| Polypropylene glycol (molecular wt. 1905) | 1905 |
| Ethylene glycol | 62 |
| Glycerine | 46 |
| Methyl isobutyl ketone solvent | 3970 |
| 2,4-tolylene diisocyanate with dry HCl added to chlorine content of 0.06% | 957 |
| | 6940 |
| Less solvent distilled | 1000 |
| Yield | 5940 |

Proportions:
- Polypropylene glycol _____ 1 mol.
- Diol (ethylene glycol) _____ 1 mol.
- Triol (glycerine) _____ 0.5 mol.
- Diisocyanate _____ 2 isocyanate groups per hydroxyl group.

The polyurethane reaction product is prepared in the apparatus described in Example 1. All of the ingredients except the diisocyanate are held at reflux temperature, about 130°–140° C., until 1000 parts of solvent have been distilled whereby substantially all of the water in the system is removed. Following addition of the diisocyanate at about room temperature, the charge is finally heated at about 80° C. for three hours.

Example 9

| Charge: | Parts by weight |
|---|---|
| Polypropylene glycol (molecular wt. 790) | 790 |
| Pentane diol | 52 |
| Trimethylol propane | 134 |
| Methyl isobutyl ketone solvent | 2759 |
| Tolylene diisocyanate (80% 2,4-; 20% 2,6-), chlorine 0.017% | 783 |
| | 4518 |
| Less solvent distilled | 1000 |
| Yield | 3518 |

Proportions:
- Polypropylene glycol _____ 1 mol.
- Diol (pentanediol) _____ 0.5 mol.
- Triol _____ 1 mol.
- Diisocyanate _____ 1.5 isocyanate groups per hydroxyl group.

Procedure same as Example 8.

Example 10

| Charge: | Parts by weight |
|---|---|
| Polypropylene glycol (molecular wt. 990) | 990 |
| Trimethylol propane | 536 |
| Methyl isobutyl ketone solvent | 6,026 |
| Methylene bis-(4-phenyl isocyanate), chlorine 0.02% | 3,500 |
| | 11,052 |
| Less solvent distilled | 1,000 |
| Yield | 10,052 |

Proportions:
- Polypropylene glycol _____ 1 mol.
- Triol _____ 4 mols.
- Diisocyanate _____ 2 isocyanate groups per hydroxyl group.

Many widely different embodiments of this invention can be made, in the light of the teachings herein, in addition to those described in the specific examples. Therefore the invention is not intended to be limited except as indicated in the appended claims.

I claim:

1. A stable, air-drying liquid organic coating composition consisting essentially of a solution in an inert, volatile organic solvent of a polyurethane reaction product of (a) 1 mol of polyalkylene glycol having a molecular weight of about 500–3000 and being a member of the class consisting of polypropylene glycol and mixtures containing at least 85 mol percent thereof with at least one member of the class consisting of polyethylene glycol and polybutylene glycol, (b) up to 1 mol of saturated aliphatic diol containing 2–6 carbon atoms per molecule, (c) 0.5–4.0 mols of saturated aliphatic triol containing 3–6 carbon atoms per molecule and (d) organic diisocyanate in an amount sufficient to provide 1.5–2.4 isocyanate groups for each hydroxyl group provided by components (a), (b), and (c); said polyurethan reaction product being prepared in the presence of from 0.003% to 0.06% by weight based on said organic diisocyanate of chlorine in the form of carbamyl chloride, with said solution further containing from 0.05 to 2.0% by weight based on the weight of said polyurethane reaction product of N,N-dimethyl dodecylamine.

2. The coating composition of claim 1 in which the organic diisocyanate is tolylene diisocyanate.

References Cited in the file of this patent

UNITED STATES PATENTS

| 2,620,349 | Slocombe | Dec. 2, 1952 |
| 2,764,565 | Hoppe et al. | Sept. 25, 1956 |
| 2,901,467 | Croco | Aug. 25, 1959 |
| 2,948,691 | Windemuth et al. | Aug. 9, 1960 |
| 2,957,832 | Gmitter et al. | Oct. 25, 1960 |

FOREIGN PATENTS

| 733,624 | Great Britain | July 13, 1955 |
| 779,806 | Great Britain | July 24, 1957 |